United States Patent
Hammitt et al.

(10) Patent No.: US 11,308,512 B2
(45) Date of Patent: Apr. 19, 2022

(54) DIFFERENTIAL BID GENERATION USING MACHINE LEARNING

(71) Applicant: Beseeq, Burlingame, CA (US)

(72) Inventors: Mark K. Hammitt, Burlingame, CA (US); Lisa C. Hammitt, Burlingame, CA (US)

(73) Assignee: Beseeq, Burlingame, CA (US)

( * ) Notice: Subject to any disclaimer, the term of this patent is extended or adjusted under 35 U.S.C. 154(b) by 0 days.

(21) Appl. No.: 17/063,345

(22) Filed: Oct. 5, 2020

(65) Prior Publication Data
US 2021/0103946 A1     Apr. 8, 2021

Related U.S. Application Data

(60) Provisional application No. 62/909,941, filed on Oct. 3, 2019.

(51) Int. Cl.
*G06Q 30/02*       (2012.01)
*G06N 20/00*       (2019.01)

(52) U.S. Cl.
CPC ......... *G06Q 30/0211* (2013.01); *G06N 20/00* (2019.01); *G06Q 30/0201* (2013.01); *G06Q 30/0205* (2013.01); *G06Q 30/0269* (2013.01)

(58) Field of Classification Search
CPC .......... G06Q 30/0211; G06Q 30/0269; G06Q 30/0201; G06Q 30/0205; G06N 20/00
See application file for complete search history.

(56) References Cited

U.S. PATENT DOCUMENTS

| | | | |
|---|---|---|---|
| 2003/0144907 A1* | 7/2003 | Cohen, Jr. .......... | G06Q 30/0269 705/14.66 |
| 2006/0122879 A1* | 6/2006 | O'Kelley .......... | G06Q 30/0254 705/14.46 |
| 2010/0100440 A1* | 4/2010 | Nickelson, III ....... | G06Q 30/02 707/E17.108 |
| 2011/0173063 A1* | 7/2011 | Bhatia ................ | G06Q 30/0247 705/14.46 |

OTHER PUBLICATIONS

"Negotiation with Price-dependent Probability Models" (Bella, Antonio & Ferri, Cèsar & Hernandez-Orallo, Jose & Ramírez-Quintana, M..-2012)—discloses various ways of optimizing revenue based on optimal offer prices and probabilities of acceptance (Year: 2012).*

* cited by examiner

*Primary Examiner* — James M Detweiler
(74) *Attorney, Agent, or Firm* — Schwegman Lundberg & Woessner, P.A.

(57) ABSTRACT

Disclosed are systems, methods, and non-transitory computer-readable media for differential bid generation using machine learning. A bid management system generates an input based on features of a content item and. The bid management system uses the input to determine acceptance probability score distributions for a set of candidate users. The bid management system uses the acceptance probability score distributions along with user attributes describing the set of candidate users along with campaign parameters to determine a subset of the candidate users to receive an offer to view the content item along with bid values to offer to each candidate user.

17 Claims, 19 Drawing Sheets

Table I: Part-worth utilities

| Gender | | Lifestyle | | Age band | | Minor children | | Income | |
|---|---|---|---|---|---|---|---|---|---|
| Level | Utility | Level | Utility | Level | Utility | Level | Utility | Level | Utility |
| F | 10 | Suburban | 45 | 36-40 | 35 | 4 | 70 | 101-125 | 70 |
| null | 5 | Town | 35 | 31-35 | 30 | 3 | 50 | 126-150 | 65 |
| M | 0 | Rural | 25 | 26-30 | 20 | 5 | 25 | 76-100 | 60 |
| | | null | 10 | 41-50 | 25 | 2 | 20 | 151-200 | 60 |
| | | Urban | 0 | 51-60 | 15 | >5 | 15 | >200 | 40 |
| | | | | null | 10 | null | 0 | 51-75 | 30 |
| | | | | 21-25 | 0 | 1 | na | null | 10 |
| | | | | 61-70 | 0 | 0 | na | 25-50 | 0 |
| | | | | 16-20 | na | | | <25 | na |
| | | | | 71-80 | na | | | | |
| | | | | >80 | na | | | | |

*FIG. 6A*

Table II: Target profiles

| Target | Gender | Cluster | Age | Minor children | Income | Utility |
|---|---|---|---|---|---|---|
| A | F | Urban | 36 | 2 | 210 | 105 |
| B | M | Town | 44 | 3 | 105 | 180 |
| C | F | Rural | 35 | 5 | 45 | 90 |
| D | M | Urban | 27 | 2 | null | 50 |
| E | O | Urban | 25 | 3 | 120 | 120 |
| F | F | Suburban | 29 | 3 | 110 | 195 |
| G | M | Urban | 24 | 2 | null | 20 |
| H | M | Rural | 25 | 2 | null | 80 |
| I | F | Suburban | 31 | 3 | 105 | 205 |
| J | F | Suburban | 42 | 4 | 90 | 210 |

FIG. 6B

Table III: Likelihood of viewing ad

| Target | Prob. of exposure | Probability of acceptance if exposed and presented bid at each level ||||||||||||||||
| --- | --- | --- | --- | --- | --- | --- | --- | --- | --- | --- | --- | --- | --- | --- | --- | --- |
| | | $1.50 | $2.00 | $2.50 | $3.00 | $3.50 | $4.00 | $4.50 | $5.00 | $5.50 | $6.00 | $6.50 | $7.00 | $7.50 | $8.00 | $8.50 | $9.00 |
| A | 24% | 5% | 8% | 10% | 13% | 15% | 18% | 20% | 23% | 25% | 28% | 30% | 33% | 35% | 38% | 40% | 43% |
| B | 82% | 40% | 43% | 45% | 48% | 50% | 53% | 55% | 58% | 60% | 63% | 65% | 68% | 70% | 73% | 75% | 78% |
| C | 76% | 30% | 34% | 38% | 42% | 46% | 50% | 54% | 58% | 62% | 66% | 70% | 74% | 78% | 82% | 86% | 90% |
| D | 55% | 45% | 47% | 48% | 50% | 51% | 53% | 54% | 56% | 57% | 59% | 60% | 62% | 63% | 65% | 66% | 68% |
| E | 30% | 20% | 23% | 25% | 28% | 30% | 33% | 35% | 38% | 40% | 43% | 45% | 48% | 50% | 53% | 55% | 58% |
| F | 72% | 15% | 16% | 16% | 17% | 18% | 19% | 19% | 20% | 21% | 21% | 22% | 23% | 23% | 24% | 25% | 26% |
| G | 40% | 50% | 51% | 52% | 53% | 54% | 55% | 56% | 57% | 58% | 59% | 60% | 61% | 62% | 63% | 64% | 65% |
| H | 25% | 30% | 33% | 36% | 39% | 42% | 45% | 48% | 51% | 54% | 57% | 60% | 63% | 66% | 69% | 72% | 75% |
| I | 18% | 35% | 37% | 38% | 40% | 41% | 43% | 44% | 46% | 47% | 49% | 50% | 52% | 53% | 55% | 56% | 58% |
| J | 37% | 45% | 46% | 47% | 48% | 49% | 50% | 51% | 52% | 53% | 54% | 55% | 56% | 57% | 58% | 59% | 60% |

*FIG. 6C*

Table IV: Expected utility

| Target | $1.50 | $2.00 | $2.50 | $3.00 | $3.50 | $4.00 | $4.50 | $5.00 | $5.50 | $6.00 | $6.50 | $7.00 | $7.50 | $8.00 | $8.50 | $9.00 |
|---|---|---|---|---|---|---|---|---|---|---|---|---|---|---|---|---|
| A | 1.3 | 1.9 | 2.5 | 3.2 | 3.8 | 4.4 | 5.0 | 5.7 | 6.3 | 6.9 | 7.6 | 8.2 | 8.8 | 9.5 | 10.1 | 10.7 |
| B | 59.0 | 62.7 | 66.4 | 70.1 | 73.8 | 77.5 | 81.2 | 84.9 | 88.6 | 92.3 | 95.9 | 99.6 | 103.3 | 107.0 | 110.7 | 114.4 |
| C | 20.5 | 23.3 | 26.0 | 28.7 | 31.5 | 34.2 | 36.9 | 39.7 | 42.4 | 45.1 | 47.9 | 50.6 | 53.4 | 56.1 | 58.8 | 61.6 |
| D | 12.4 | 12.8 | 13.2 | 13.6 | 14.0 | 14.4 | 14.9 | 15.3 | 15.7 | 16.1 | 16.5 | 16.9 | 17.3 | 17.7 | 18.2 | 18.6 |
| E | 7.2 | 8.1 | 9.0 | 9.9 | 10.8 | 11.7 | 12.6 | 13.5 | 14.4 | 15.3 | 16.2 | 17.1 | 18.0 | 18.9 | 19.8 | 20.7 |
| F | 21.1 | 22.0 | 23.0 | 24.0 | 25.0 | 26.0 | 27.0 | 27.9 | 28.9 | 29.9 | 30.9 | 31.9 | 32.9 | 33.8 | 34.8 | 35.8 |
| G | 4.0 | 4.1 | 4.2 | 4.2 | 4.3 | 4.4 | 4.5 | 4.6 | 4.6 | 4.7 | 4.8 | 4.9 | 5.0 | 5.0 | 5.1 | 5.2 |
| H | 6.0 | 6.6 | 7.2 | 7.8 | 8.4 | 9.0 | 9.6 | 10.2 | 10.8 | 11.4 | 12.0 | 12.6 | 13.2 | 13.8 | 14.4 | 15.0 |
| I | 12.9 | 13.5 | 14.0 | 14.6 | 15.1 | 15.7 | 16.2 | 16.8 | 17.3 | 17.9 | 18.5 | 19.0 | 19.6 | 20.1 | 20.7 | 21.2 |
| J | 35.0 | 35.7 | 36.5 | 37.3 | 38.1 | 38.9 | 39.6 | 40.4 | 41.2 | 42.0 | 42.7 | 43.5 | 44.3 | 45.1 | 45.8 | 46.6 |

*FIG. 7A*

Table V: Incremental expected utility

| Target | $1.50 | $2.00 | $2.50 | $3.00 | $3.50 | $4.00 | $4.50 | $5.00 | $5.50 | $6.00 | $6.50 | $7.00 | $7.50 | $8.00 | $8.50 | $9.00 |
|---|---|---|---|---|---|---|---|---|---|---|---|---|---|---|---|---|
| A | 1.3 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| B | 59.0 | 3.7 | 3.7 | 3.7 | 3.7 | 3.7 | 3.7 | 3.7 | 3.7 | 3.7 | 3.7 | 3.7 | 3.7 | 3.7 | 3.7 | 3.7 |
| C | 20.5 | 2.7 | 2.7 | 2.7 | 2.7 | 2.7 | 2.7 | 2.7 | 2.7 | 2.7 | 2.7 | 2.7 | 2.7 | 2.7 | 2.7 | 2.7 |
| D | 12.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| E | 7.2 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| F | 21.1 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| G | 4.0 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| H | 6.0 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| I | 12.9 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| J | 35.0 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |

*FIG. 7B*

Table VI: Expected spending

| Target | $1.50 | $2.00 | $2.50 | $3.00 | $3.50 | $4.00 | $4.50 | $5.00 | $5.50 | $6.00 | $6.50 | $7.00 | $7.50 | $8.00 | $8.50 | $9.00 |
|---|---|---|---|---|---|---|---|---|---|---|---|---|---|---|---|---|
| A | $0.02 | $0.04 | $0.06 | $0.09 | $0.13 | $0.17 | $0.22 | $0.27 | $0.33 | $0.40 | $0.47 | $0.55 | $0.63 | $0.72 | $0.82 | $0.92 |
| B | $0.49 | $0.70 | $0.92 | $1.17 | $1.44 | $1.72 | $2.03 | $2.36 | $2.71 | $3.08 | $3.46 | $3.87 | $4.31 | $4.76 | $5.23 | $5.72 |
| C | $0.34 | $0.52 | $0.72 | $0.96 | $1.22 | $1.52 | $1.85 | $2.20 | $2.59 | $3.01 | $3.46 | $3.94 | $4.45 | $4.99 | $5.56 | $6.16 |
| D | $0.37 | $0.51 | $0.66 | $0.82 | $0.98 | $1.16 | $1.34 | $1.53 | $1.72 | $1.93 | $2.15 | $2.37 | $2.60 | $2.84 | $3.09 | $3.34 |
| E | $0.09 | $0.14 | $0.19 | $0.25 | $0.32 | $0.39 | $0.47 | $0.56 | $0.66 | $0.77 | $0.88 | $1.00 | $1.13 | $1.26 | $1.40 | $1.55 |
| F | $0.16 | $0.23 | $0.30 | $0.37 | $0.45 | $0.53 | $0.62 | $0.72 | $0.82 | $0.92 | $1.03 | $1.14 | $1.26 | $1.39 | $1.52 | $1.65 |
| G | $0.30 | $0.41 | $0.52 | $0.64 | $0.76 | $0.88 | $1.01 | $1.14 | $1.28 | $1.42 | $1.56 | $1.71 | $1.86 | $2.02 | $2.18 | $2.34 |
| H | $0.11 | $0.17 | $0.23 | $0.29 | $0.37 | $0.45 | $0.54 | $0.64 | $0.74 | $0.86 | $0.98 | $1.10 | $1.24 | $1.38 | $1.53 | $1.69 |
| I | $0.09 | $0.13 | $0.17 | $0.21 | $0.26 | $0.31 | $0.36 | $0.41 | $0.47 | $0.52 | $0.59 | $0.65 | $0.72 | $0.78 | $0.86 | $0.93 |
| J | $0.25 | $0.34 | $0.43 | $0.53 | $0.63 | $0.74 | $0.85 | $0.96 | $1.08 | $1.20 | $1.32 | $1.45 | $1.58 | $1.72 | $1.86 | $2.00 |

FIG. 7C

Table VII: Incremental expected spending

| Target | $1.50 | $2.00 | $2.50 | $3.00 | $3.50 | $4.00 | $4.50 | $5.00 | $5.50 | $6.00 | $6.50 | $7.00 | $7.50 | $8.00 | $8.50 | $9.00 |
|---|---|---|---|---|---|---|---|---|---|---|---|---|---|---|---|---|
| A | $0.02 | $0.02 | $0.02 | $0.03 | $0.04 | $0.04 | $0.05 | $0.05 | $0.06 | $0.07 | $0.07 | $0.08 | $0.08 | $0.09 | $0.10 | $0.10 |
| B | $0.49 | $0.21 | $0.23 | $0.25 | $0.27 | $0.29 | $0.31 | $0.33 | $0.35 | $0.37 | $0.39 | $0.41 | $0.43 | $0.45 | $0.47 | $0.49 |
| C | $0.34 | $0.17 | $0.21 | $0.24 | $0.27 | $0.30 | $0.33 | $0.36 | $0.39 | $0.42 | $0.45 | $0.48 | $0.51 | $0.54 | $0.57 | $0.60 |
| D | $0.37 | $0.14 | $0.15 | $0.16 | $0.17 | $0.17 | $0.18 | $0.19 | $0.20 | $0.21 | $0.21 | $0.22 | $0.23 | $0.24 | $0.25 | $0.26 |
| E | $0.09 | $0.05 | $0.05 | $0.06 | $0.07 | $0.08 | $0.08 | $0.09 | $0.10 | $0.11 | $0.11 | $0.12 | $0.13 | $0.14 | $0.14 | $0.15 |
| F | $0.16 | $0.06 | $0.07 | $0.07 | $0.08 | $0.08 | $0.09 | $0.09 | $0.10 | $0.10 | $0.11 | $0.11 | $0.12 | $0.12 | $0.13 | $0.13 |
| G | $0.30 | $0.11 | $0.11 | $0.12 | $0.12 | $0.12 | $0.13 | $0.13 | $0.14 | $0.14 | $0.14 | $0.15 | $0.15 | $0.16 | $0.16 | $0.16 |
| H | $0.11 | $0.05 | $0.06 | $0.07 | $0.08 | $0.08 | $0.09 | $0.10 | $0.11 | $0.11 | $0.12 | $0.13 | $0.14 | $0.14 | $0.15 | $0.16 |
| I | $0.09 | $0.04 | $0.04 | $0.04 | $0.05 | $0.05 | $0.05 | $0.05 | $0.06 | $0.06 | $0.06 | $0.06 | $0.07 | $0.07 | $0.07 | $0.07 |
| J | $0.25 | $0.09 | $0.09 | $0.10 | $0.10 | $0.11 | $0.11 | $0.11 | $0.12 | $0.12 | $0.12 | $0.13 | $0.13 | $0.14 | $0.14 | $0.14 |

*FIG. 8A*

Table VIII: Incremental expected utility per incremental expected spending

| Target | $1.50 | $2.00 | $2.50 | $3.00 | $3.50 | $4.00 | $4.50 | $5.00 | $5.50 | $6.00 | $6.50 | $7.00 | $7.50 | $8.00 | $8.50 | $9.00 |
|---|---|---|---|---|---|---|---|---|---|---|---|---|---|---|---|---|
| A | | | | | | | | | | | 8.8 | 8.1 | 7.5 | 7.0 | 6.6 | 6.2 |
| B | | | | | | | | | | | | 9.0 | 8.6 | 8.2 | 7.8 | 7.5 |
| C | | | 2.9 | 2.8 | 2.6 | 2.5 | 2.4 | 2.3 | 2.2 | 2.1 | 2.0 | 1.9 | 1.8 | 5.1 | 4.8 | 4.6 |
| D | | | | | | | | | | | 1.9 | 1.9 | | 1.7 | 1.7 | 1.6 |
| E | | | | | | | | | | 6.5 | 6.1 | 5.7 | 5.4 | | | |
| F | | | | | | | | 8.4 | 7.1 | | | | | | | |
| G | | | 0.7 | 0.7 | 0.7 | 0.6 | 0.6 | 0.6 | 0.6 | 0.6 | 0.6 | 0.5 | 0.5 | 0.5 | 0.5 | 0.5 |
| H | | | | 8.9 | 8.0 | 7.3 | 6.7 | 6.2 | 5.7 | 5.3 | 5.0 | 4.7 | 4.4 | 4.2 | 4.0 | 3.8 |
| I | | | | | | | | | | | 9.0 | 8.7 | 8.3 | 8.0 | 7.7 | 7.4 |
| J | 8.6 | 8.2 | 7.9 | 7.6 | 7.4 | 7.1 | 6.9 | 6.7 | 6.5 | 6.3 | 6.1 | 5.9 | 5.8 | 5.6 | 5.5 | |

FIG. 8B

Table IX: Cumulative results

| Target | expected spending incremental | expected spending cumulative | expected utility incremental | expected utility cumulative | expected utility/$ |
|---|---|---|---|---|---|
| J | $0.25 | $0.25 | 35.0 | 35.0 | 140.0 |
| I | $0.09 | $0.34 | 12.9 | 47.9 | 139.1 |
| F | $0.16 | $0.51 | 21.1 | 68.9 | 136.2 |
| B | $0.49 | $1.00 | 59.0 | 128.0 | 128.2 |
| E | $0.09 | $1.09 | 7.2 | 135.2 | 124.2 |
| A | $0.02 | $1.11 | 1.3 | 136.4 | 123.3 |
| C | $0.34 | $1.45 | 20.5 | 157.0 | 108.4 |
| H | $0.11 | $1.56 | 6.0 | 163.0 | 104.4 |
| A | $0.02 | $1.58 | 0.6 | 163.6 | 103.6 |
| D | $0.37 | $1.95 | 12.4 | 176.0 | 90.2 |
| A | $0.02 | $1.97 | 0.6 | 176.6 | 89.6 |
| A | $0.03 | $2.00 | 0.6 | 177.2 | 88.4 |
| E | $0.05 | $2.05 | 0.9 | 178.1 | 86.9 |
| B | $0.21 | $2.25 | 3.7 | 181.8 | 80.7 |
| A | $0.04 | $2.29 | 0.6 | 182.4 | 79.7 |
| E | $0.05 | $2.34 | 0.9 | 183.3 | 78.3 |
| B | $0.23 | $2.57 | 3.7 | 187.0 | 72.8 |
| C | $0.17 | $2.74 | 2.7 | 189.8 | 69.2 |
| F | $0.06 | $2.81 | 1.0 | 190.8 | 68.0 |
| B | $0.25 | $3.05 | 3.7 | 194.4 | 63.7 |
| A | $0.04 | $3.09 | 0.6 | 195.1 | 63.0 |
| I | $0.04 | $3.13 | 0.6 | 195.6 | 62.5 |
| F | $0.07 | $3.20 | 1.0 | 196.6 | 61.4 |
| I | $0.04 | $3.24 | 0.6 | 197.2 | 60.8 |
| B | $0.27 | $3.51 | 3.7 | 200.9 | 57.3 |
| C | $0.21 | $3.71 | 2.7 | 203.6 | 54.8 |
| E | $0.06 | $3.77 | 0.9 | 204.5 | 54.2 |
| F | $0.07 | $3.85 | 1.0 | 205.5 | 53.4 |
| G | $0.30 | $4.15 | 4.0 | 209.5 | 50.5 |
| A | $0.05 | $4.19 | 0.6 | 210.1 | 50.1 |
| I | $0.04 | $4.24 | 0.6 | 210.7 | 49.7 |
| B | $0.29 | $4.52 | 3.7 | 214.3 | 47.4 |
| F | $0.08 | $4.60 | 1.0 | 215.3 | 46.8 |

*FIG. 9A*

Table IX: Cumulative results (continued)

| Target | expected spending incremental | expected spending cumulative | expected utility incremental | expected utility cumulative | expected utility/$ |
|---|---|---|---|---|---|
| I | $0.05 | $4.65 | 0.6 | 215.9 | 46.4 |
| E | $0.07 | $4.72 | 0.9 | 216.8 | 46.0 |
| E | $0.08 | $3.58 | 0.9 | 201.8 | 56.3 |
| A | $0.05 | $3.63 | 0.6 | 202.4 | 55.8 |
| B | $0.31 | $3.94 | 3.7 | 206.1 | 52.3 |
| E | $0.08 | $4.96 | 0.9 | 217.7 | 43.9 |
| A | $0.05 | $3.99 | 0.6 | 206.7 | 51.8 |
| F | $0.08 | $4.08 | 1.0 | 207.7 | 51.0 |
| C | $0.24 | $4.31 | 2.7 | 210.4 | 48.8 |
| I | $0.05 | $4.36 | 0.6 | 211.0 | 48.4 |
| H | $0.05 | $4.41 | 0.6 | 211.6 | 48.0 |
| B | $0.33 | $4.74 | 3.7 | 215.3 | 45.4 |
| F | $0.09 | $4.83 | 1.0 | 216.2 | 44.8 |
| I | $0.05 | $4.88 | 0.6 | 216.8 | 44.4 |
| E | $0.08 | $6.23 | 0.9 | 230.9 | 37.1 |
| B | $0.35 | $5.30 | 3.7 | 221.4 | 41.8 |
| A | $0.06 | $5.36 | 0.6 | 222.0 | 41.4 |
| F | $0.09 | $5.46 | 1.0 | 223.0 | 40.9 |
| I | $0.05 | $5.51 | 0.6 | 223.6 | 40.6 |
| C | $0.27 | $5.78 | 2.7 | 226.3 | 39.2 |
| B | $0.37 | $6.15 | 3.7 | 230.0 | 37.4 |
| H | $0.06 | $6.29 | 0.6 | 231.5 | 36.8 |
| E | $0.09 | $7.45 | 0.9 | 242.5 | 32.6 |
| F | $0.10 | $6.39 | 1.0 | 232.5 | 36.4 |
| I | $0.06 | $6.44 | 0.6 | 233.0 | 36.2 |
| A | $0.07 | $6.51 | 0.6 | 233.7 | 35.9 |
| B | $0.39 | $6.90 | 3.7 | 237.3 | 34.4 |
| I | $0.06 | $6.96 | 0.6 | 237.9 | 34.2 |
| F | $0.10 | $7.06 | 1.0 | 238.9 | 33.8 |
| C | $0.30 | $7.36 | 2.7 | 241.6 | 32.8 |
| B | $0.41 | $7.86 | 3.7 | 246.2 | 31.3 |
| F | $0.11 | $7.97 | 1.0 | 247.2 | 31.0 |

*FIG. 9B*

MAX $$\sum_{i=1}^{N}\sum_{j=1}^{A} u_i v_i w_{i,j} x_{i,j}$$

ST $$\sum_{i=1}^{N}\sum_{j=1}^{A} p_{i,j} x_{i,j} \leq \text{Total Budget}$$

$x \leq 1$ $x \geq 0$ $$\sum_{j=1}^{A} x_{i,j} \leq 1 \quad \forall i$$

where  $u_i$ is the utility of individual $i$
$v_i$ is the probability of exposure for individual $i$
$w_{i,j}$ is the probability of acceptance at a bid level $j$ for individual $i$
$p_j$ is the value (price) of bid level $j$
N is the number of individuals in the target pool
A is the number of bid levels
x is an integer variable

*FIG. 10*

DIFFERENTIAL BID GENERATION USING MACHINE LEARNING

CROSS-REFERENCE TO RELATED APPLICATIONS

The present application claims the benefit of priority of U.S. Provisional Application No. 62/909,941, filed on Oct. 3, 2019, which is incorporated herein by reference in its entirety.

TECHNICAL FIELD

An embodiment of the present subject matter relates generally to bid generation and, more specifically, to differential bid generation using machine learning.

BACKGROUND

New technologies and services have made it possible for content providers to provide content to a wide audience of users. In some instance, content providers may attempt to encourage users to view the content by offering users a monetary reward to do so. The value to the content provider associated with a user viewing their content may vary based on the content and the user. For example, a content provider providing content relating to a minivan may consider a 35-year-old living in an Atlanta suburb with three kids as a significantly more valuable target than a 48-year-old with two kids that lives in rural Minnesota. Similarly, the same content provider may consider there to be little to no value in presenting the content to a 25-year-old childless single in downtown Chicago. Offering certain users a monetary reward to view the content item may therefore be detrimental to the content provider. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 6A-6C show TABLE I, TABLE III and TABLE II, according to some example embodiments.

FIGS. 7A-7C show TABLE IV, TABLE V and TABLE VI, according to some example embodiments.

FIGS. 8A and 8B show TABLE VII and TABLE VIII, according to some example embodiments.

FIGS. 9A and 9B show TABLE IX, according to some example embodiments.

FIG. 10 shows an example of applicable integer programming equations, according to some example embodiments.

DETAILED DESCRIPTION

Figure 1:
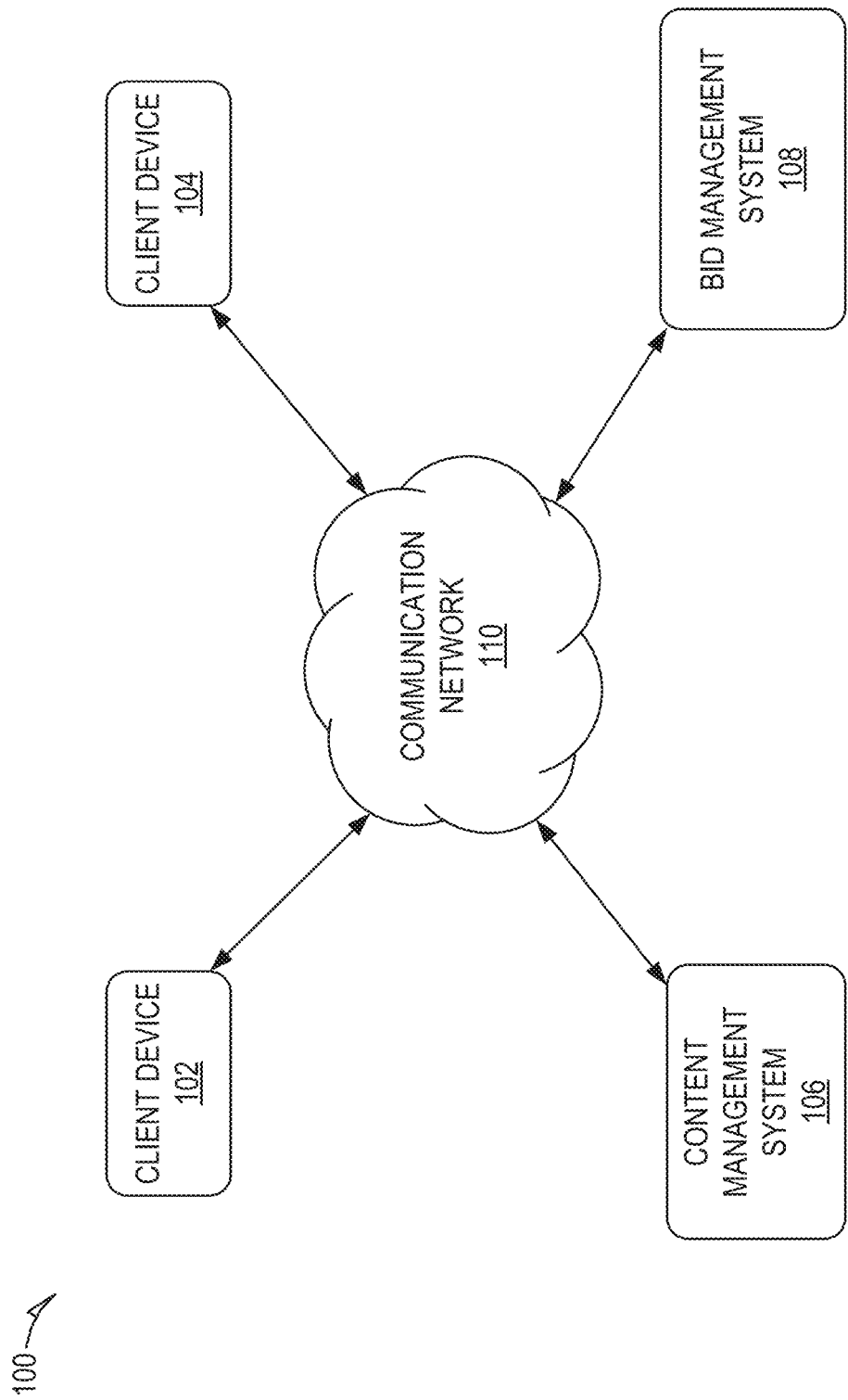
FIG. 1 shows a system for differential bid generation using machine learning, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and computer-readable storage media for differential bid generation using machine learning. A bid management system determines a subset of candidate users to receive an offer to view a content item and an associated bid value for each candidate user. The bid value may be a monetary value (e.g., $1, $2, etc.) offered to the candidate user as a reward to entice the user to view the content item.

To select the subset of candidate users and determine the bid value to be offered the candidate users for viewing a content item, the bid management system generates an input based on the content item. For example, the input may be generated based on a set of content features describing the content item. The set of content features may include any type of feature describing the content item, such as the length, format, offered product or service, content provider, and the like. The input may also be based on contextual features describing a current viewing condition, such as the time of day, weather, and the like.

The bid management system provides the generated input into a machine learning model that outputs an acceptance probability score distribution for each candidate user. The acceptance probability score distribution for each candidate users indicates likelihoods that the candidate user will accept an offer to view the content items when offered various bid values. For example, the acceptance probability score distribution for a candidate user may include an acceptance probability score indicating the likelihood that the candidate user will accept an offer of $1 to view the content, another acceptance probability score indicating the likelihood that the candidate user will accept an offer of $2, and so on.

The machine learning model may be generated based on historical training data associated with the candidate users. The historical training data may include data describing previous offers provided to the candidate users, such as data describing the content items, the bid amount offered to the candidate user, whether the candidate user accepted the offer, contextual data describing the conditions when the offer was provided to the candidate user, and the like. The machine learning model may use the data indicating whether the candidate user either accepted or declined the offer as positive or negative labels used for training. That is, the machine learning model uses data describing offers that the candidate user accepted as positive examples of offers that the candidate user is likely to accept, and data describing offers that the candidate user declined as negative examples of offers that the candidate user is not likely to accept.

The bid management system also determines a utility value for each candidate user based on feedback provided by an entity (e.g., content provider) associated with the content item. The utility value for each candidate user indicates a relative value to the entity derived from the candidate viewing the content item. The feedback provided by the entity may identify the value of various user attributes to the entity in relation to the content item. For example, the feedback may indicate the user attributes that the entity perceives to be of higher value as well as user attributes that the entity perceives to be of lower value. The bid management system uses the feedback data and user attributes of each candidate user to determine the utility value for each candidate user.

The bid management system uses the utility values for the candidate users along with the acceptance probability score distributions for each user to determine an estimated return utility table. The estimated return utility table includes a set of estimated return utility values for each candidate user. Each estimated return utility value indicates the estimated value that the entity will receive based on the candidate user viewing the content item for a given bid amount. For example, the estimated return utility table may include an estimated return utility value indicating the return value to the entity associated with a candidate user viewing the content item in exchange for $1, another estimated return utility value indicating the return value to the entity associated with a candidate user viewing the content item in exchange for $2, and so on.

The bid management system selects the subset of candidate users and the bid value to offer each candidate user based on the estimated return utility table. For example, the bid management system may identify the subset of candidate users by identifying candidate users that are associated with at least one estimated return utility value that is above a threshold estimated utility value. The bid management system may then select the lowest bid value for each of the identified candidate users that has an estimated return utility value that is above a threshold estimated utility value. Finally, the bid management system may select the finalize subset of candidate users based on the lowest bid values to maximize specified campaign parameters, such as an overall campaign budget.

FIG. 1 shows an example system 100 for differential bid generation using machine learning, according to some example embodiments. As shown, multiple devices (e.g., client device 102, client device 104, content management system 106, and bid management system 108) are connected to a communication network 110 and configured to communicate with each other through use of the communication network 110. The communication network 110 is any type of network, including a local area network (LAN), such as an intranet, a wide area network (WAN), such as the Internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1300 shown in FIG. 13.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The content management system 106 is one or more computing devices configured to present content to a user. Content may include any of a variety of types of content, such as video, voice, text, applications, and the like. For example, content may be an education course, training video, exam, advertisement, interactive application, article, and the like.

A user interacts with the content management system 106 via a client-side application installed on the client devices 102 and 104. In some embodiments, the client-side application includes a component specific to the content management system 106. For example, the component may be a stand-alone application, one or more application plug-ins, and/or a browser extension. However, the users may also interact with the content management system 106 via a third-party application, such as a web browser, that resides on the client devices 102 and 104 and is configured to communicate with the content management system 106. In either case, the client-side application presents a user interface (UI) for the user to interact with the content management system 106 to utilize the provided online service. For example, the user interacts with the content management system 106 via a client-side application integrated with the file system or via a webpage displayed using a web browser application.

Although the shown system 100 includes only two client devices 102, 104 and one content management system 106, this is only for ease of explanation and is not meant to be limiting. One skilled in the art would appreciate that the system 100 can include any number of client devices 102, 104 and/or content management system 106. Further, the content management system 106 may concurrently accept connections from and interact with any number of client devices 102, 104. The customer computing system 106 may support connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

The content management system 106 may offer users a reward as an incentive to view content. For example, the reward may be a monetary reward, coupon, item, and the like. The content management system 106 may utilize the functionality of the bid management system 108 to determine which users to offer a reward for viewing a content item as well as the bid value to offer the user. Although the content management system 106 and the bid management system 108 are shown as separate entities, this is just one example and is not meant to be limiting. The functionality of the bid management system 108 may be partially or completely integrated into the content management system 106 and this disclosure anticipates all such embodiments.

The bid management system 108 determines a subset of candidate users to receive an offer to view a content item and an associated bid value for each candidate user. The bid value may be a monetary value (e.g., $1, $2, etc.) offered to the candidate user as a reward to entice the user to view the content item.

To select the subset of candidate users and determine the bid value to be offered the candidate users for viewing a content item, the bid management system 108 generates an input based on the content item. For example, the bid management system 108 may receive the content item and/or data describing the content item from the content management system 196. The bid management system 108 may generate the input based on a set of content features describing the content item. The set of content features may include any type of feature describing the content item, such as the length, format, offered product or service, content provider, and the like. The input may also be based on contextual features describing a current viewing condition, such as the time of day, weather, and the like. The bid management system 108 may generate the input using any of a variety of techniques. For example, in some embodiments, the bid management system 108 may generate an embedding vector based on the feature data describing the content item and/or the on contextual features describing a current viewing condition.

The bid management system 108 provides the generated input into a machine learning model that outputs an acceptance probability score distribution for each candidate user. The acceptance probability score distribution for each candidate users indicates likelihoods that the candidate user will accept an offer to view the content items when offered various bid values. For example, the acceptance probability score distribution for a candidate user may include an acceptance probability score indicating the likelihood that the candidate user will accept an offer of $1 to view the content, another acceptance probability score indicating the likelihood that the candidate user will accept an offer of $2, and so on.

The bid management system 108 generates the machine learning model based on historical training data associated with the candidate users. The historical training data may include data describing previous offers provided to the candidate users, such as data describing the content items, the bid amount offered to the candidate user, whether the candidate user accepted the offer, contextual data describing the conditions when the offer was provided to the candidate user, and the like. The bid management system 108 may access the historical training data from the content management system 106 and/or from stored historical logs.

When training the machine learning model, the data indicating whether the candidate user either accepted or declined the offer may be used to label the training data as being either a positive or negative example. That is, the machine learning model uses data describing offers that the candidate user accepted as positive examples of offers that the candidate user is likely to accept, and data offers that the candidate user declined as negative examples of offers that the candidate user is not likely to accept when setting various weights associated with features extracted from the training data, such as time of day, length of content, bid value, and the like.

The bid management system 108 also determines a utility value for each candidate user based on feedback provided by an entity (e.g., content provider) associated with the content item. The utility value for each candidate user indicates a relative value to the entity derived from the candidate viewing the content item. The feedback provided by the entity may identify the value of various user attributes to the entity in relation to the content item. For example, the feedback may indicate the user attributes that the entity perceives to be of higher value as well as user attributes that the entity perceives to be of lower value. The bid management system 108 uses the feedback data and user attributes of each candidate user to determine the utility value for each candidate user.

The bid management system 108 uses the utility values for the candidate users along with the acceptance probability score distributions for each user to determine an estimated return utility table (e.g., Table VIII shown in FIG. 8B). The estimated return utility table includes a set of estimated return utility values for each candidate user. Each estimated return utility value indicates the estimated value that the entity will receive based on the candidate user viewing the content item for a given bid amount. For example, the estimated return utility table may include an estimated return utility value indicating the return value to the entity associated with a candidate user viewing the content item in exchange for $1, another estimated return utility value indicating the return value to the entity associated with a candidate user viewing the content item in exchange for $2, and so on. The estimated return utility values may be represented as incremental changes in the return value based on subsequent bid offers. For example, the estimated return utility table may include an estimated return utility value indicating the return value to the entity associated with a candidate user viewing the content item in exchange for $1, another estimated return utility value indicating an incremental change in the return value to the entity associated with a candidate user viewing the content item in exchange for $2 rather than $1, and so on.

The bid management system 108 selects the subset of candidate users and the bid value to offer each candidate user based on the estimated return utility table. The bid management system 108 may perform this in multiple ways and using various techniques. For example, the bid management system 108 may identify a subset of estimated return utility values for each candidate user that is above a threshold estimated utility value and corresponds to a bid value that is below a threshold bid value (e.g., a maximum bid set by the campaign). The bid management system 108 may then utilize the subset of estimated return utility values for each candidate user to determine the subset of candidate users and bid values for the content item to optimize specified campaign parameters, such as an overall campaign budget. For example, the bid management system 108 may determine the subset of candidate users and bid values that provides the highest overall estimated return utility value.

The bid management system 108 provides data identifying the subset of candidate users and the bid value to offer each candidate user to the content management system 106. In turn, the content management system 106 may use the received data to manage submitting offers to the candidate users. For example, the content management system 106 may submit offers to the candidate users based on the bid value associated with the candidate user.

Figure 2:
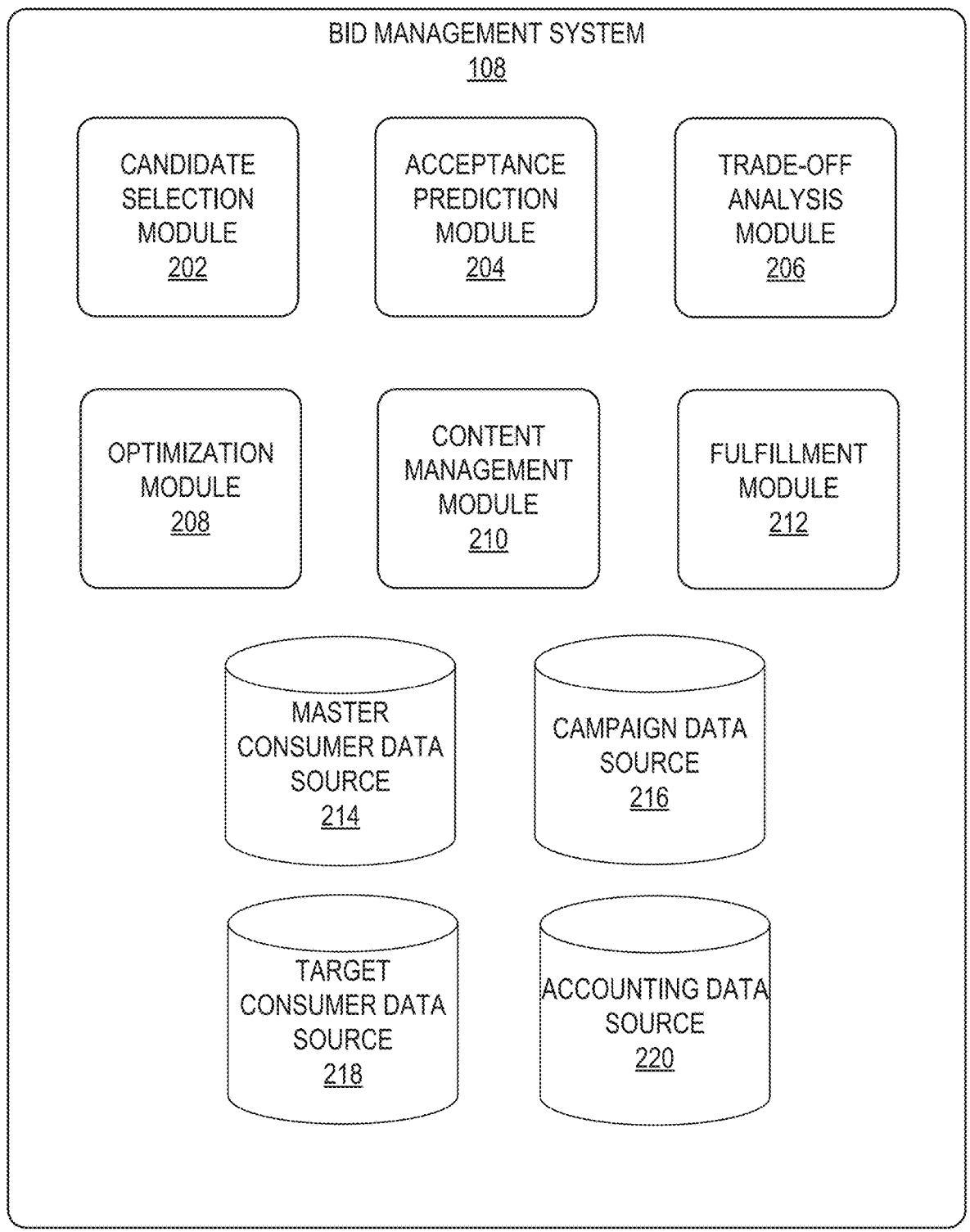
FIG. 2 shows a block diagram of a bid management system, according to some example, embodiments.

FIG. 2 shows a block diagram of a bid management system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the bid management system 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the bid management system 108 includes a candidate selection module 202, an acceptance prediction module 204, a trade-off analysis module 206, an optimization module 208, a content management module 210, a fulfillment module 212, a master consumer data source 214, a campaign data source 216, a target consumer data source 218 and an accounting data source 220.

The candidate selection module 202 selects a set of candidate users for a content item. For example, the candidate selection module 202 may select the set of candidate users based on user attributes associated with the candidate users and target parameters defined by a content provider or other entity (e.g., advertiser) associated with the content item. The candidate selection module 202 may access the user attributes from the master consumer data source 214 and the target parameters from the campaign data source 216.

The acceptance prediction module 204 determines an acceptance probability score distribution for each candidate user. For example, the acceptance prediction module 204 generates an input based on a set of content features describing the content item. The set of content features may include any type of feature describing the content item, such as the length, format, offered product or service, content provider, and the like. The acceptance prediction module 204 may also generate the input based on contextual features describing a current viewing condition, such as the time of day, weather, and the like.

The acceptance prediction module 204 uses the generated input as input into a machine learning model that outputs the acceptance probability score distributions for each candidate user. The acceptance probability score distribution for each candidate users indicates likelihoods that the candidate user will accept an offer to view the content items when offered various bid values. For example, the acceptance probability score distribution for a candidate user may include an acceptance probability score indicating the likelihood that the candidate user will accept an offer of $1 to view the content, another acceptance probability score indicating the likelihood that the candidate user will accept an offer of $2, and so on.

The acceptance prediction module 204 may generate the machine learning model based on historical training data associated with the candidate users. The historical training data may include data describing previous offers provided to the candidate users, such as data describing the content items, the hid amount offered to the candidate user, whether the candidate user accepted the offer, contextual data describing the conditions when the offer was provided to the candidate user, and the like.

The trade-off analysis module 206 determines a utility value for each candidate user based on feedback provided by an entity (e.g., content provider) associated with the content item. The utility value for each candidate user indicates a relative value to the entity derived from the candidate viewing the content item. The feedback provided by the entity may identify the value of various user attributes to the entity in relation to the content item. For example, the feedback may indicate the user attributes that the entity perceives to be of higher value as well as user attributes that the entity perceives to be of lower value. The trade-off analysis module 206 uses the feedback data and user attributes of each candidate user to determine the utility value for each candidate user. The trade-off analysis module 206 may store the determined utility value for each candidate user in the target consumer data source 218.

The optimization module 208 uses the utility values for the candidate users along with the acceptance probability score distributions for each user to determine an estimated return utility table. The estimated return utility table includes a set of estimated return utility values for each candidate user. Each estimated return utility value indicates the estimated value to the entity resulting from the candidate user viewing the content item for a given bid amount. For example, the estimated return utility table may include an estimated return utility value indicating the return value to the entity associated with a candidate user viewing the content item in exchange for $1, another estimated return utility value indicating the return value to the entity associated with a candidate user viewing the content item in exchange for $2, and so on.

The optimization module 208 selects the subset of candidate users and the bid value to offer each candidate user based on the estimated return utility table. For example, the optimization module 208 may select the bid value for each of the identified users such that the incremental expected utility produced by the incremental bid value investment is approximately the same across all the identified users and such that the aggregate expected bid value does not exceed the campaign budget or any minimum Return On Investment (ROI) level/This may accomplished recursively through a series of table scans that incrementally add bid value to the user or users that offer the then-available highest incremental utility in return for that incremental bid value, continuing until the campaign budget is reached or the minimum ROI is reached. Alternatively, this can be accomplished formulaically by moving up the individual $\Delta U/\Delta BV$ functions until the slopes are equalized and campaign budget is met.

The content management module 210 manages delivery and monitoring of the content item to the selected candidate users. This may include assembling an offer to view a content item for delivery, delivering the offer to the candidate user, determining whether the candidate user viewed the offer, presenting the content item to the candidate user, determining whether the offer was accepted, and the like. In response to a candidate user accepting the offer and successfully viewing the content item, the fulfillment module 212 commits the transaction to the accounting data source 220.

Figure 3:
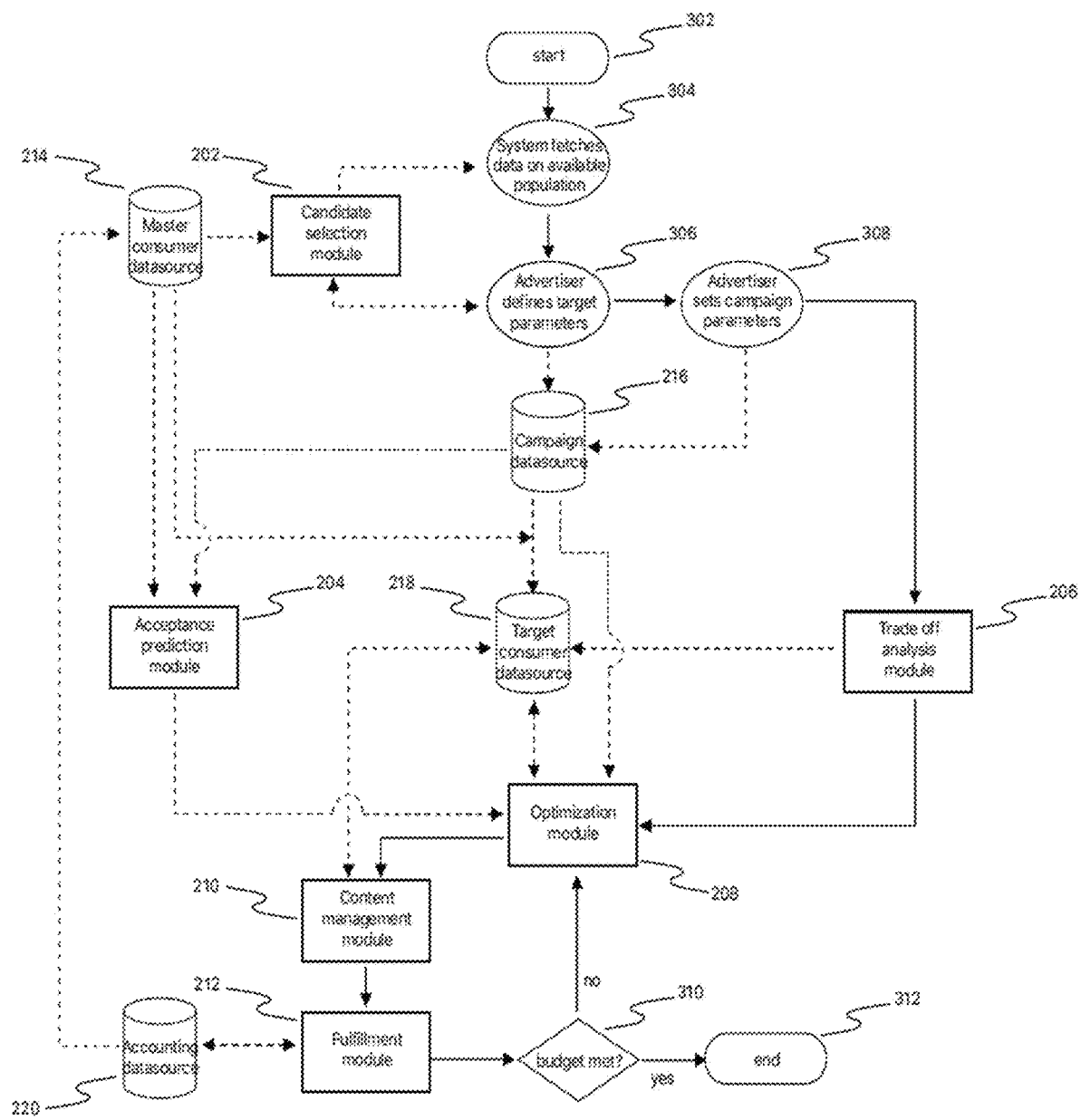
FIG. 3 is a flow diagram of differential bid generation using machine learning, according to some example embodiments.

FIG. 3 is a flow diagram of differential bid generation using machine learning, according to some example embodiments. After the start 302, the bid management system 108 fetches data 304 on available consumers from master consumer data source 214 via the candidate selection module 202. The data describes a plurality of consumers corresponding to selected qualifying attributes, if any, other qualifying attributes available, and the estimated number of qualifying consumers available for exposure to the advertisement over a designated time frame. The content provider (e.g., advertiser) defines target parameters 306, which go back into the candidate selection module 202 to constrain the number of qualifying, available consumers. The bid management system 108 again fetches data on the available population 304 so the content provider can further define target parameters 306.

When the content provider is satisfied with the pool of available, qualifying consumers, the bid management system 108 writes the target parameters to campaign data source 216. The content provider also sets campaign parameters 308 such as the campaign budget, the dates of the campaign, the optimization strategy, proximity conflicts, any stratification, etc. The bid management system 108 writes the campaign parameters to the campaign data source 216.

Figure 4:
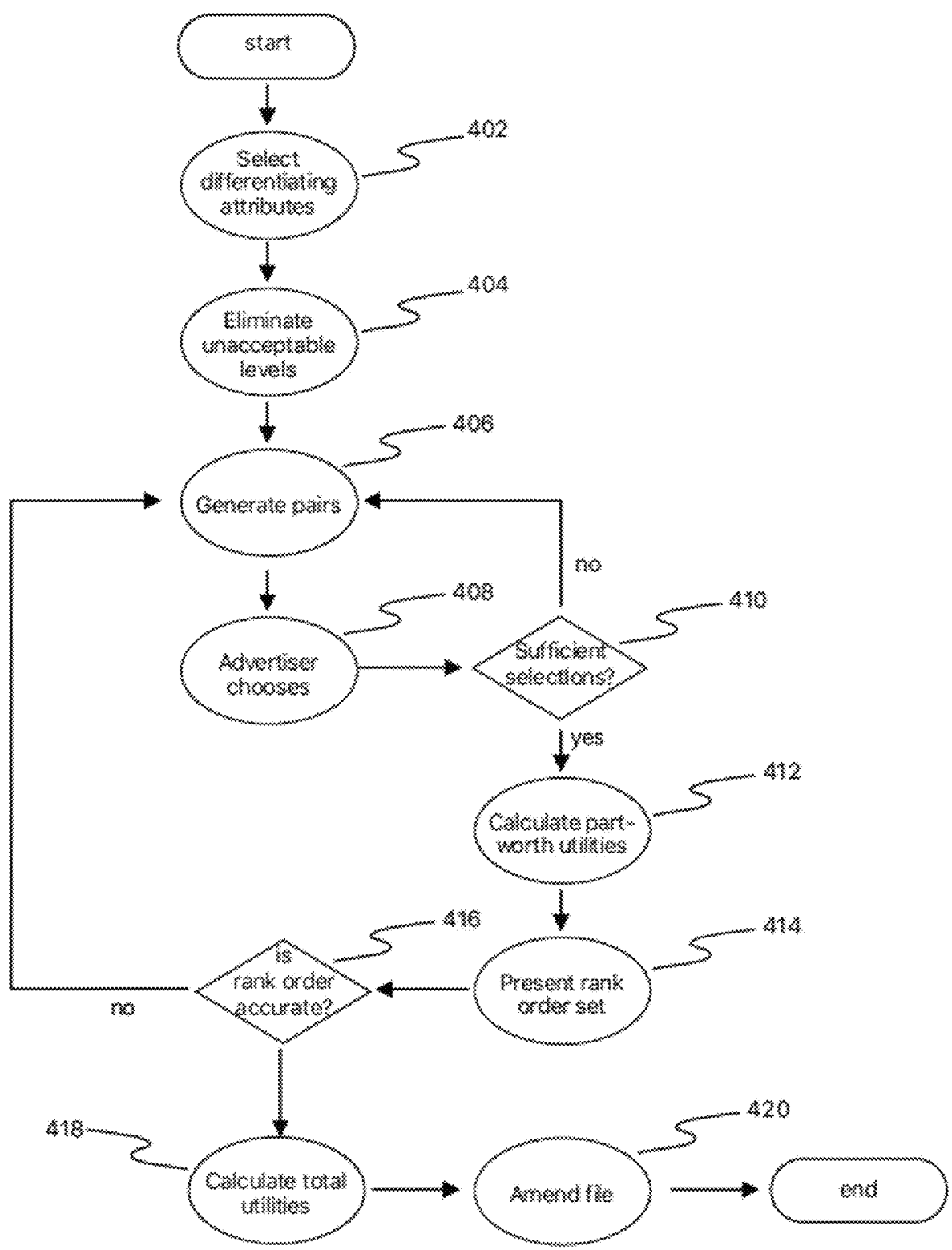
FIG. 4 is a flow diagram of steps involved in a trade-off analysis module, according to some example embodiments.

FIG. 4 is a flow diagram of steps involved in a trade-off analysis module 206, according to some example embodiments.

Within trade-off analysis module 206, the advertiser first selects differentiating attributes 402. Note that, for the purpose of describing this invention, differentiating attributes may or may not overlap with qualifying attributes. For example, an advertiser may feature a product designed exclusively for women, so eliminating men from the pool of qualifying consumers quickly reduces the consideration set, making it more manageable. In this example, gender is a qualifying attribute but not a differentiating attribute.

The advertiser then eliminates unacceptable levels 404 of differentiating attributes. Going back to our original minivan example, advertisers may never target a consumer over 70 years of age, or one who makes less than $25,000 per year, so these levels would be eliminated. The bid management system 108 then generates pairs 406, doing so by first dividing the remaining acceptable range within each attribute into interior levels. This division has the effect of creating, for ordinal attributes, a piecewise-linear curve. Once the levels are set, the bid management system 108 (not shown) uses an orthogonal array to create representative combinations of attributes ("stimulus descriptions").

Next, the bid management system 108 presents two stimulus descriptions to the advertiser, and advertiser chooses 408 the stimulus description that represents the more attractive target. Generate pairs 406 is repeated until enough selections have been made to proceed, based on sufficient selections fork 410.

The bid management system 108 uses the advertiser's responses to the advertiser chooses 408 step to calculate part-worth utilities 412 for each level of each differentiating attribute. TABLE I (shown in FIG. 6A) shows an example of part-worth utilities in the minivan example.

Next, in present rank order set 214, the bid management system 108 uses the part-worth utilities to arrange a set of stimulus descriptions in rank order, and presents the set of rank-ordered stimulus descriptions to the advertiser. If the advertiser confirms its accuracy, per rank order accuracy fork 216, the bid management system 108 proceeds; otherwise, it loops back to the generate pairs 206 step.

The trade-off analysis module 206 then applies the confirmed part-worth utilities to the known attribute values of the pool of available, qualifying consumers to calculate total utilities 218 for each available, qualifying consumer. TABLE II (shown in FIG. 6B) illustrates the relationship between the attribute values (second through sixth columns) of ten consumers and the resulting utilities, derived from the part-worth utilities in the seventh column of TABLE I. Target A, for example, is a female, urban, 36-year-old with two minor children and an annual household income of $210,000, and the corresponding part-worth utilities of 10, 0, 35, 20 and 40 sum to her total utility of 105.

Note that the ten-consumer example used throughout this description is highly simplified; typical consumer sets will number in the hundreds of thousands to tens of millions.

The final step of trade-off analysis module 206 is amend file 220. Combined with customer data from the master consumer data source 214 and target parameters from campaign data source 216, amend file 220 in this instance creates in target consumer data source 218 a persistent, accessible record of total utility for each available, qualifying consumer.

Acceptance prediction module 204 accesses the usage and bid acceptance history of each consumer from the master consumer data source 214 and accesses the campaign parameters from campaign data source 216. From the usage history, the module determines the probability that the consumer will access the digital publication and be exposed to the advertiser's bid offer while the campaign is active. Similarly, the module may apply heuristic search, Bayesian belief networks (e.g., to process rich semantics contained within the consumer data source 214 and campaign data source 216), and back-propagation neural networks to the bid acceptance history in order to predict each consumer's probability of accepting a bid based on exogenous variables such as the bid amount, the length of the ad, and the ad category, and on endogenous variables such as gender, age, and income. To the extent that the campaign proves to show rates of bid acceptance higher or lower than predicted, based on updates to the master consumer data source 214, the acceptance prediction module 204 will adjust its predictions accordingly.

A simple, tabular representation of the output of acceptance prediction model 204 is illustrated as TABLE III (shown in FIG. 6C). The second column, probability of exposure, shows the probability that the consumer will see the bid. The third through eighteenth columns show the probability that the consumer will accept the specified bid, if exposed to it. In this example, the bids don't go lower than $1.50. The product of the probability of exposure and the probability of acceptance is the overall predicted likelihood that the consumer will accept the bid over the course of the campaign.

Figure 5:
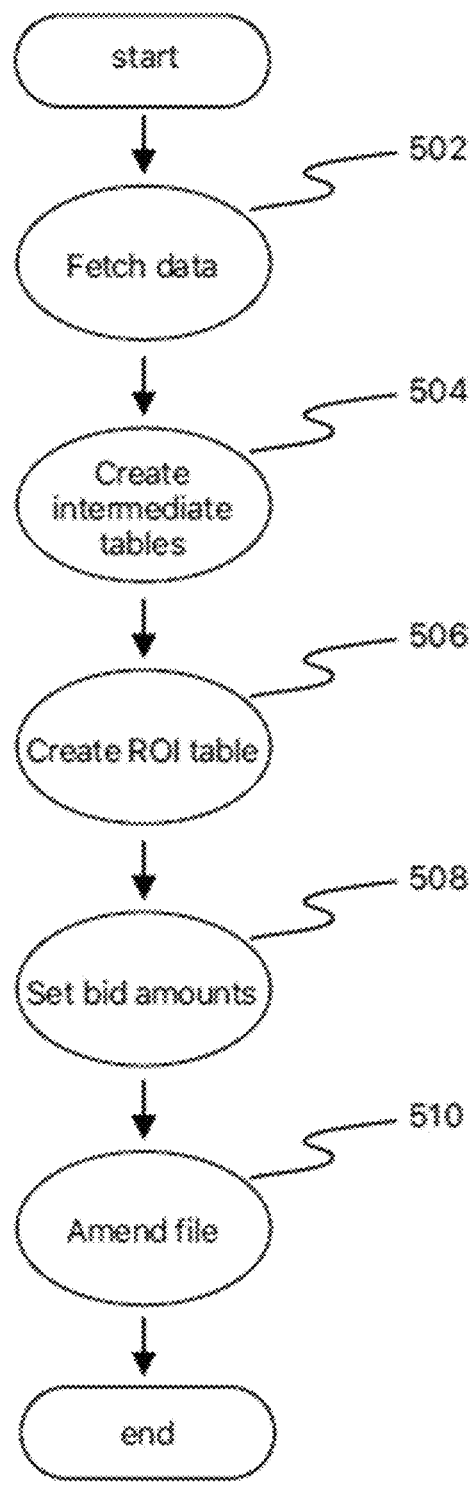
FIG. 5 is a flow diagram of steps involved in an optimization module, according to some example embodiments.

FIG. 5 is a flow diagram of steps involved in an optimization module 208, according to some example embodiments.

The first step of optimization module 208, fetch data 502, retrieves the following: consumer utilities from target consumer data source 218; probability of exposure and probability of acceptance from acceptance prediction module 204; and the campaign budget from campaign data source 216. These data are used to create intermediate tables 504. Following our minivan example with ten target consumers, the intermediate tables are:

TABLE IV (shown in FIG. 7A). This is calculated as the product of the target consumer's probability of exposure from TABLE III, the target consumer's probability of acceptance of a given bid from TABLE III, and the target consumer's utility from TABLE II.

TABLE V (shown in FIG. 7B). This is calculated as the difference between the expected utility of the target consumer at the given bid level and the expected utility of the target consumer at the immediately lower bid level, if any, both from TABLE IV.

TABLE VI (shown in FIG. 7C). This is calculated as the product of the target consumer's probability of exposure from TABLE III, the target consumer's probability of acceptance of a given bid from TABLE III, and the given bid level in the top row of TABLE VI.

TABLE VII (shown in FIG. 8A). This is calculated as the difference between the expected spending on the target consumer at the given bid level and the expected spending on the target consumer at the immediately lower bid level, if any, both from TABLE VI.

Calculate ROI table 506 follows immediately after calculate intermediate tables 504. The ROI table is illustrated as TABLE VIII (shown in FIG. 8B). This is calculated as the target consumer's incremental expected utility at the given bid level in TABLE V, divided by the incremental expected spending on the target consumer at the given hid level in TABLE VI.

Set bid amounts 508 selects the maximum number of highest-value, left-to-right contiguous cells in TABLE VIII up to the point where the sum of those cells falls one cell short of exceeding the campaign budget. The shaded cells in TABLE VIII are the maximum number of highest-value cells that fall within an $8.00 campaign budget, and TABLE IX (shown in FIGS. 9A and 9B) shows that the campaign can expect to spend $7.97 and achieve a utility of 247.2.

Per TABLE VIII, the initial bid offers that will produce this expected yield correspond to the bid offer represented by the rightmost shaded cell in each row: $6.00 for target A, $7.00 for target B, $4.00 for target C, $1.50 for target D, $5.50 for target F, $6.50 for target F, $1.50 for target G, $2.50 for target H, $6.00 for target I, and $1.50 for target J.

The final step of optimization module 208 is amend file 510, writing to the target viewer consumer data source 218 the initial bid offer, if any, for each target viewer.

Control passes from the optimization module 208 to content management module 210. The content management module 210 will first determine whether a content consumer has a bid offer assigned to him or her in the target consumer data source 218. If so, the content management module 210 will assemble for presentation the ad, the ad thumbnail, the bid offer from target consumer data source 218, a description of the ad, and the duration of the ad.

Figure 11:
FIG. 11 depicts a user interface view of bid offers to watch advertisements, according to some example embodiments.

FIG. 11 depicts a user interface view of bid offers to watch advertisements, according to some example embodiments. As shown, ad thumbnails 1102 are arranged in a tiled array. Immediately under each ad thumbnail 1102 is a short description of advertisement 1108, and under that is bid offer 1104 and advertisement runtime 1106.

In addition to serving up and presenting the ad and related content, the content management module 210 will monitor whether the bid offer was visible to the consumer and for how long; will determine if the offer was accepted; will determine if the consumer complied with the conditions for remuneration; and will handle pauses and other exceptions to the task completion. The content management module 210 will also log in the target consumer data source 218 how many times, if any, the bid offer was not accepted by a consumer; whether the bid offer was accepted; and, whether the conditions for remuneration were fulfilled.

For each successfully viewed ad, control passes from content management module 210 to fulfillment module 212, which in turn commits the transaction to accounting data source 220, logs the activity in the master consumer data source 214, and checks to see if the budget has been met, per budget fork 310. If the budget has been met, the campaign ends; otherwise, the process loops back to optimization module 208.

Data updates in master consumer data source 214 trigger new analyses by the acceptance prediction module 204, and the resulting updated models flow back into the optimization module 208.

Operation

What follows is an example of how the described embodiment might operate and is not intended to foreclose the nearly infinite operational combinations that would inevitably flow from variations in use cases, bidder preferences, consumer attributes, design decisions, system parameters, and user behavior:

A media planner for an advertising agency logs into a computer application to arrange a campaign for a minivan client. He provides information such as the name of the campaign, the dates it should run, and the magazine title whose subscriber she wants to reach. The application returns a gross number of subscribers and an extensive list of their attributes. He wants to exclude consumers who meet certain criteria, so he defines target attributes 306 by selecting age and excluding consumers under 21 and older than 70; selecting income and excluding consumers who earn less than $25,000 per year; and, selecting minor children at home and excluding those with fewer than two. As he does this, the number of available consumers returned by the bid management system 108 goes down.

The bid management system 108 then asks the media planner to set additional campaign parameters 308, so he specifies that the campaign will start in three days and run for up to ten days; that the budget is $80,000; and that he would like to optimize "expected utility." The bid management system 108 further asks the media planner to select differentiating attributes 102, and he selects gender, lifestyle, age, number of minor children at home, and annual income. The bid management system 108 asks if the media planner wants to eliminate unacceptable levels 104 of attributes beyond the exclusions expressed in step 306; having no further limitations, he skips this step.

The bid management system 108 presents the media planner with pairs of stimulus descriptions. The first choice he considers is between a 50-year-old urban male with 2 minor children and an income of $150,000 versus a 25-year old rural female with 4 minor children and an income of $75,000. He chooses the latter, and the bid management system 108 presents him with another choice. In all, he chooses between 35 pairs. After the last pair of stimulus descriptions, the bid management system 108 presents a series of stimulus descriptions and asks the media planner to identify and rearrange any description that does not improve on the one that immediately precedes it. He completes the exercise with only a few minor adjustments, concluding the trade-off analysis.

When the campaign starts three days later, a 29-year-old suburban mother with three kids and an annual income of $190,000 logs in to her user account and reads some articles. She sees an alert that some video ads are available for her to watch, so she taps on the link and sees a tiled array of different ad offers such as those in FIG. 11. She scrolls down and sees an ad for a minivan. She sees that the ad is one-minute-and-fifteen-seconds long and is offered $6.50 to watch it. She clicks on the image and a video ad plays. When the ad finishes, a message flashes that she successfully earned the offered $6.50, and she goes back to the tiled array in FIG. 11.

A few seconds later, a 25-year-old rural father of 3 with an annual income of $80,000 sees a similar tiled array that includes an offer to watch the same one-minute-and-fifteen-seconds minivan ad. He is offered only $2.50 for watching it, so he ignores it in favor of a better paying and more relevant ad.

After six days, the media planner is informed that the campaign's budget has been met, reaching 17,655 consumers with an aggregate utility of 2,472,182.

Alternative Embodiments

Although advertising is one activity that has a need to offer differential incentives across a plurality of heterogeneous service providers, other activities include crowdsourced product design; crowdsourced product, service, marketing, movie, television, or advertising testing; crowdsourced capture of weather data; Mechanical Turk-style task distribution; and, fundraising appeals.

Although presenting potential service providers with fixed, "best-and-final offer" bids is one way to recruit for services, other methods include bids that change over time such as those found in a reverse Dutch auction and those that respond to counteroffers.

Although having the advertiser define target parameters in step 306 is one way to narrow the consideration set, other methods include omitting this step entirely and combining the step with the eliminate unacceptable levels 104 step.

Although using a hybrid conjunctive-compensatory approach to conjoint analysis (often in the form of a choice-based conjoint "CBC" analysis) is one way to capture the trade-offs advertisers make between different consumer attributes, other methods include a purely compensatory approach to conjoint analysis, adaptive conjoint analysis "ACA," self-explicated measurement "SEM" of individual or paired attributes, adaptive self-explication of multiattribute preferences "ASEMAP," structural equation modeling (also called "SEM"), and the fast polyhedral method "FPM."

Although using pairs of stimulus descriptions is one way to conjointly gather preferences from entities bidding for services, other methods include sorting a virtual or physical stack of stimulus descriptions.

Although using an orthogonal array is one way to create representative sets of stimulus descriptions, other methods include random pair assignments, all pairs testing, and other fractional factorial techniques.

Although the various data sources are represented in the figures by a traditional symbol for a database, the data sources can be any computer-readable medium, such as a magnetic storage device, optical storage device, solid state drive, cloud-accessible storage device, or a virtual data source such as that which might be available in RAM.

Although using separate data sources is one way to retain and manage data, other methods include combining data sources, replicating data sources, and further division of data sources.

Although maximizing expected utility is one strategy for optimizing spending, other strategies include maximizing different metrics such as stratified expected utility, aggregate reach, stratified reach, acquired lifetime value, retained lifetime value, propensity to buy, and competitive conversions.

Although the tiled array shown in FIG. 11 is one way to present bid offers to target consumers, other methods include presenting offers in the context of editorial copy, as part of a digital pin board, as a playlist, and as part of a list of tasks that need to be performed.

Although the advertising information shown in FIG. 11 is one way to present bid offers to consumers, other methods include showing a static or animated graphic, conveying more or less information than that shown in FIG. 11, using graphs or icons to symbolize information such as bid offer (e.g., a stack of coins) and runtime (e.g., a clock), and showing information through pop-up or hover-over messages.

Although accumulating the highest ratios of incremental expected utility to expected expenditure is one method for calculating bid offers that conform to an optimization strategy, other methods include using integer programming or linear programming, or incorporating bid value as an attribute in the trade-off analysis. FIG. 10 shows an example of applicable integer programming equations, according to some example embodiments. As shown, the top equation describes the objective function to be maximized and the subsequent equations describing the constraints the optimization would be subject to ("ST").

Although having the advertiser set campaign parameters after the advertiser defines target parameters is one way to collect campaign information, other methods include reversing that order, and performing those steps in parallel.

Although arranging discrete values in tables is one way to perform optimization, other methods include calculating expected-utility-to-expected-utility curves for each user and then finding the lowest positive slope that, when applied across all curves, just depletes the campaign budget.

Although running the optimization module 208 every time there's an update is one way to maintain model integrity, other methods include running the module periodically, and keeping the model static for the duration of the campaign.

Although using a combination of heuristic search, Bayesian belief networks, and back-propagation neural networks is one way to calculate probabilities of acceptance, other methods include using these techniques individually or using multiple linear regression, structural equation modeling or other multivariate analysis techniques.

Although running the acceptance prediction module 204 every time there's an update is one way to maintain model integrity, other methods include running the module periodically, and keeping the model static for the duration of the campaign.

Although presenting a rank ordered set of stimulus descriptions is one way to check the accuracy of part worth utilities, other methods include checking for consistency at during other steps or omitting steps entirely.

Software Architecture

Figure 12:
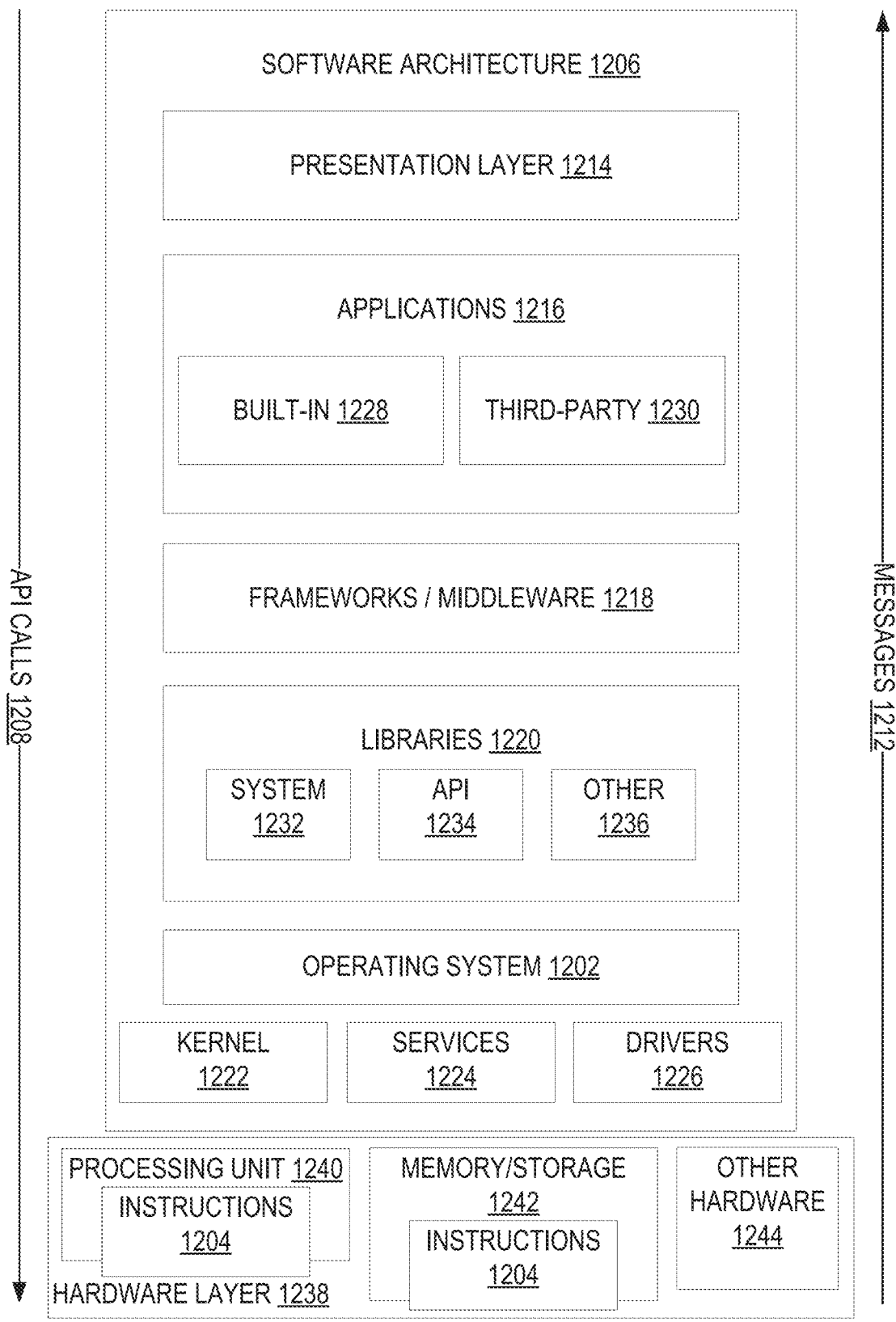
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating an example software architecture 1206, which may be used in conjunction with various hardware architectures herein described. FIG. 12 is a non-limiting example of a software architecture 1206 and it will be appreciated that many other architectures may be implemented to facilitate the functionality described herein. The software architecture 1206 may execute on hardware such as machine 1300 of FIG. 13 that includes, among other things, processors 1304, memory 1314, and (input/output) I/O components 1318. A representative hardware layer 1238 is illustrated and can represent, for example, the machine 1300 of FIG. 13. The representative hardware layer 1238 includes a processing unit 1240 having associated executable instructions 1204. Executable instructions 1204 represent the executable instructions of the software architecture 1206, including implementation of the methods, components, and so forth described herein. The hardware layer 1238 also includes memory and/or storage modules 1242, which also have executable instructions 1204. The hardware layer 1238 may also comprise other hardware 1244.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke application programming interface (API) calls 1208 through the software stack and receive a response such as messages 1212 in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224, and/or drivers 1226). The libraries 1220 may include system libraries 1232 (e.g., C standard library) that may provide functions such as memory allocation functions, string manipulation functions, mathematical functions, and the like. In addition, the libraries 1220 may include API libraries 1234 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries SQLite that may provide various relational database functions), web libraries (e.g., WebKit that may provide web browsing functionality), and the like.

The libraries 1220 may also include a wide variety of other libraries 1236 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphical user interface (GUI) functions, high-level resource management, high-level location services, and so forth. The frameworks/middleware 1218 may provide a broad spectrum of other APIs that may be used by the applications 1216 and/or other software components/modules, some of which may be specific to a particular operating system 1202 or platform.

The applications 1216 include built-in applications 1228 and/or third-party applications 1230. Examples of representative built-in applications 1228 may include, but are not limited to, a contacts application, a browser application, a book reader application, a location application, a media application, a messaging application, and/or a game application. Third-party applications 1230 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1230 may invoke the API calls 1208 provided by the mobile operating system (such as operating system 1202) to facilitate functionality described herein.

The applications 1216 may use built in operating system functions (e.g., kernel 1222, services 1224, and/or drivers 1226), libraries 1220, and frameworks/middleware 1218 to create UIs to interact with users of the bid management system 108. Alternatively, or additionally, in some systems, interactions with a user may occur through a presentation layer, such as presentation layer 1214. In these systems, the application/component "logic" can be separated from the aspects of the application/component that interact with a user.

Figure 13:
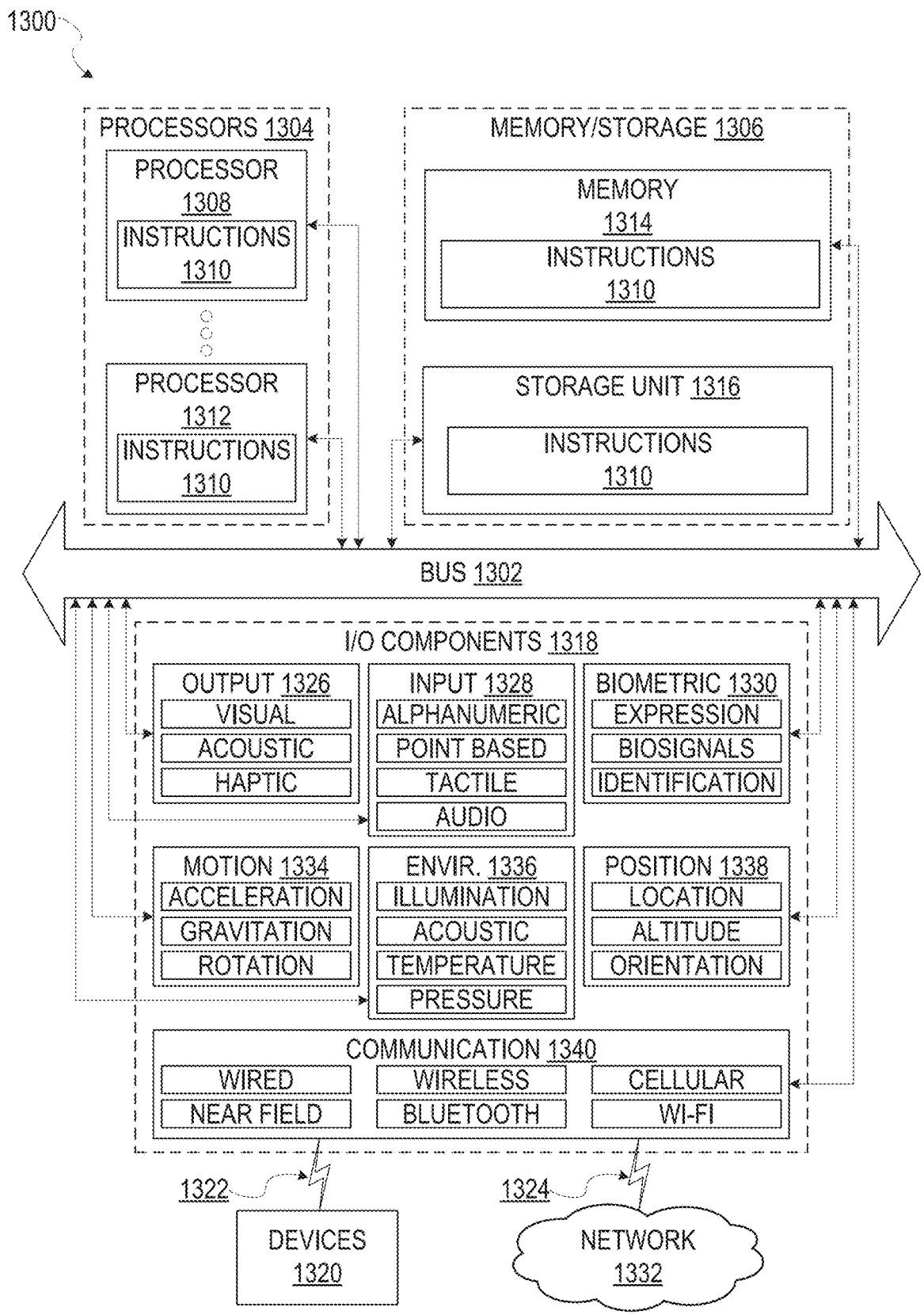
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions 1204 from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1300 capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touch screen, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1324 and coupling 1322, respectively. For example, the communication components 1340 may include a network interface component or other suitable device to interface with the network 1332. In further examples, communication components 1340 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include radio frequency identification (REID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1310 for execution by the machine 1300, and includes digital or analog communications signals or other intangible medium to facilitate communication of such instructions 1310. Instructions 1310 may be transmitted or received over the network 1332 using a transmission medium via a network interface device and using any one of a number of well-known transfer protocols.

"CLIENT DEVICE" in this context refers to any machine 1300 that interfaces to a communications network 1332 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1332.

"COMMUNICATIONS NETWORK" in this context refers to one or more portions of a network 1332 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1332 or a portion of a network 1332 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1310 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1310. The term "machine-readable medium" shall also be taken to include any medium, or combination of multiple media, that is capable of storing instructions 1310 (e.g., code) for execution by a machine 1300, such that the instructions 1310, when executed by one or more processors 1304 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 1304) may be configured by software (e.g., an application 1216 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1304 or other programmable processor 1304. Once configured by such software, hardware components become specific machines 1300 (or specific components of a machine 1300) uniquely tailored to perform the configured functions and are no longer general-purpose processors 1304. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1304 configured by software to become a special-purpose processor, the general-purpose processor 1304 may be configured as respectively different special-purpose processors (e.g., comprising different hardware components) at different times. Software accordingly configures a particular processor or processors 1304, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1302) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1304 that are temporarily configured (e.g., by software) or permanently configured to perform the relevant operations. Whether temporarily or permanently configured, such processors 1304 may constitute processor-implemented components that operate to perform one or more operations or functions described herein. As used herein, "processor-implemented component" refers to a hardware component implemented using one or more processors 1304. Similarly, the methods described herein may be at least partially processor-implemented, with a particular processor or processors 1304 being an example of hardware. For example, at least some of the operations of a method may be performed by one or more processors 1304 or processor-implemented components. Moreover, the one or more processors 1304 may also operate to support performance of the relevant operations in a "cloud computing" environment or as a "software as a service" (SaaS). For example, at least some of the operations may be performed by a group of computers (as examples of machines 1300 including processors 1304), with these operations being accessible via a network 1332 (e.g., the Internet) and via one or more appropriate interfaces (e.g., an API). The performance of certain of the operations may be distributed among the processors 1304, not only residing within a single machine 1300, but deployed across a number of machines 1300. In some example embodiments, the processors 1304 or processor-implemented components may be located in a single geographic location (e.g., within a home environment, an office environment, or a server farm). In other example embodiments, the processors 1304 or processor-implemented components may be distributed across a number of geographic locations.

"PROCESSOR" in this context refers to any circuit or virtual circuit (a physical circuit emulated by logic executing on an actual processor 1304) that manipulates data values according to control signals (e.g., "commands," "op codes," "machine code," etc.) and which produces corresponding output signals that are applied to operate a machine 1300. A processor 1304 may be, for example, a central processing unit (CPU), a reduced instruction set computing (RISC) processor, a complex instruction set computing (CNC) processor, a graphics processing unit (GPU), a digital signal processor (DSP), an ASIC, a radio-frequency integrated circuit (RFIC) or any combination thereof. A processor 1304 may further be a multi-core processor having two or more independent processors 1304 (sometimes referred to as "cores") that may execute instructions 1310 contemporaneously.

What is claimed is:

1. A method comprising:
   accessing historical training data associated a set of candidate users, the historical training data including bid amounts provided to the set of candidate users in previous offers and data indicating whether the previous offers were accepted;
   generating a neural network based on the historical training data, the neural network being trained to output an acceptance probability score distribution based on content features that describe an input content item and data that describe an input candidate user, the acceptance probability score distribution indicating likelihoods that the input candidate user will view the input content item in exchange for each bid value from a set of bid values;
   generating a first set of content features that describe a first content item;
   using the neural network, on a first input that is based on the first set of content features, to generate a first respective acceptance probability score distribution for each respective candidate user in the set of candidate users to yield a first set of acceptance probability score distributions, each first respective acceptance probability score distribution indicating likelihoods that the respective candidate user will view the first content item in exchange for each bid value from the set of bid values;
   determining a first subset of the set of candidate users to receive an offer to view the first content item and a first set of bid values corresponding to the first subset of the set of candidate users, the determining of the first subset of candidate users being based on the first set of acceptance probability score distributions, user attributes that describe the set of candidate users, and campaign parameters associated with the first content item; and
   providing, by one or more hardware processors, the offer to view the first content item to at least a first candidate user included in the first subset of the set of candidate users, the offer being based on a first bid value from the first set of bid values, the first bid value corresponding to the first candidate user.

2. The method of claim 1, wherein determining the first subset of the set of candidate users to receive the offer to view the first content item and the first set of bid values corresponding to the first subset of the set of candidate users comprises:
   determining a respective utility value for each respective candidate user in the set of candidate users, yielding a set of utility values, each respective utility value indicating a relative value of the respective candidate user to an entity associated with the first content item;
   generating an estimated return utility table based on the set of utility values and the first set of acceptance probability score distributions, the estimated return utility table including a respective set of estimated return utility values for each respective candidate user, each respective set of estimated return utility values including estimated return utility values that indicates an estimated return utility to the entity resulting from the respective candidate user viewing the first content item based on the set of bid values; and selecting the first subset of the set of candidate users and corresponding bid values based on the estimated return utility table.

3. The method of claim 2, wherein selecting the first subset of the set of candidate users and corresponding bid values based on the estimated return utility table comprises:
  determining, based on a first set of estimated return utility values corresponding to the first candidate user, that:
    a first estimated return utility value from the first set of estimated return utility values corresponds to the first bid value,
    the first bid value is less than a threshold bid value dictated by the campaign parameters associated with the first content item, and
    the first estimated return utility value from the first set of estimated return utility values meets or exceeds a threshold estimated return utility value.

4. The method of claim 3, wherein selecting the first subset of the set of candidate users and corresponding bid values based on the estimated return utility table comprises:
  determining, based on the first set of estimated return utility values corresponding to the first candidate user, that:
    a second estimated return utility value from the first set of estimated return utility values corresponds to a second bid value that is less than the threshold bid value dictated by the campaign parameters associated with the first content item, and
    the second estimated return utility value from the first set of estimated return utility values meets or exceeds the threshold estimated return utility value; and
  selecting the first bid value for the first candidate user based on determining that the first bid value is less that the second bid value.

5. The method of claim 1, wherein the first input is further based on a first set of contextual features describing a current viewing condition.

6. The method of claim 1, further comprising:
  generating a second set of content features that describe a second content item;
  using the neural network, on a second input that is based on the second set of content features, to generate a second respective acceptance probability score distribution for each respective candidate user in the set of candidate users to yield a second set of acceptance probability score distributions, each second respective acceptance probability score distribution from the second set of acceptance probability score distributions indicating likelihoods that the respective candidate user will view the second content item in exchange for each bid value from the set of bid values;
  determining a second subset of the set of candidate users to receive an offer to view the second content item and a second set of bid values corresponding to the second subset of the set of candidate users, the determining of the second subset of candidate users being based on the second set of acceptance probability score distributions, the user attributes that describe the set of candidate users, and second campaign parameters associated with the second content item; and
  providing the offer to view the second content item to at least a second candidate user included in the second subset of the set of candidate users, the offer being based on a second bid value from the second set of bid values, the second bid value corresponding to the second candidate user.

7. A system comprising:
  one or more computer processors; and
  one or more computer-readable mediums storing instructions that, when executed by the one or more computer processors, cause the system to perform operations comprising:
    accessing historical training data associated a set of candidate users, the historical training data including bid amounts provided to the set of candidate users in previous offers and data indicating whether the previous offers were accepted;
    generating a neural network based on the historical training data, the neural network trained to output an acceptance probability score distribution based on content features that describe an input content item and data that describe an input candidate user, the acceptance probability score distribution indicating likelihoods that the input candidate user will view the input content item in exchange for each bid value from a set of bid values;
    generating a first set of content features that describe a first content item;
    using the neural network, on a first input that is based on the first set of content features, to generate a first respective acceptance probability score distribution for each respective candidate user in the set of candidate users to yield a first set of acceptance probability score distributions, each first respective acceptance probability score distribution indicating likelihoods that the respective candidate user will view the first content item in exchange for each bid value from the set of bid values;
    determining a first subset of the set of candidate users to receive an offer to view the first content item and a first set of bid values corresponding to the first subset of the set of candidate users, the determining of the first subset of candidate users being based on the first set of acceptance probability score distributions, user attributes that describe the set of candidate users, and campaign parameters associated with the first content item; and
    providing the offer to view the first content item to at least a first candidate user included in the first subset of the set of candidate users, the offer being based on a first bid value from the first set of bid values, the first bid value corresponding to the first candidate user.

8. The system of claim 7, wherein determining the first subset of the set of candidate users to receive the offer to view the first content item and the first set of bid values corresponding to the first subset of the set of candidate users comprises:
  determining a respective utility value for each respective candidate user in the set of candidate users, yielding a set of utility values, each respective utility value indicating a relative value of the respective candidate user to an entity associated with the first content item;
  generating an estimated return utility table based on the set of utility values and the first set of acceptance probability score distributions, the estimated return utility table including a respective set of estimated return utility values for each respective candidate user, each respective set of estimated return utility values including estimated return utility values that indicates an estimated return utility to the entity resulting from the respective candidate user viewing the first content item based on the set of bid values; and selecting the first subset of the set of candidate users and corresponding bid values based on the estimated return utility table.

9. The system of claim 8, wherein selecting the first subset of the set of candidate users and corresponding bid values based on the estimated return utility table comprises:
   determining, based on a first set of estimated return utility values corresponding to the first candidate user, that:
   a first estimated return utility value from the first set of estimated return utility values corresponds to the first bid value,
   the first bid value is less than a threshold bid value dictated by the campaign parameters associated with the first content item, and
   the first estimated return utility value from the first set of estimated return utility values meets or exceeds a threshold estimated return utility value.

10. The system of claim 9, wherein selecting the first subset of the set of candidate users and corresponding bid values based on the estimated return utility table comprises:
    determining, based on the first set of estimated return utility values corresponding to the first candidate user, that:
    a second estimated return utility value from the first set of estimated return utility values corresponds to a second bid value that is less than the threshold bid value dictated by the campaign parameters associated with the first content item, and
    the second estimated return utility value from the first set of estimated return utility values meets or exceeds the threshold estimated return utility value; and
    selecting the first bid value for the first candidate user based on determining that the first bid value is less that the second bid value.

11. The system of claim 7, wherein the first input is further based on a first set of contextual features describing a current viewing condition.

12. The system of claim 7, the operations further comprising:
    generating a second set of content features that describe a second content item;
    using the neural network, on a second input that is based on the second set of content features, to generate a second respective acceptance probability score distribution for each respective candidate user in the set of candidate users to yield a second set of acceptance probability score distributions, each second respective acceptance probability score distribution from the second set of acceptance probability score distributions indicating likelihoods that the respective candidate user will view the second content item in exchange for each bid value from the set of bid values;
    determining a second subset of the set of candidate users to receive an offer to view the second content item and a second set of bid values corresponding to the second subset of the set of candidate users, the determining of the second subset of candidate users being based on the second set of acceptance probability score distributions, the user attributes that describe the set of candidate users, and second campaign parameters associated with the second content item; and
    providing the offer to view the second content item to at least a second candidate user included in the second subset of the set of candidate users, the offer being based on a second bid value from the second set of bid values, the second bid value corresponding to the second candidate user.

13. A non-transitory computer-readable medium storing instructions that, when executed by one or more computer processors of one or more computing devices, cause the one or more computing devices to perform operations comprising:
    accessing historical training data associated a set of candidate users, the historical training data including bid amounts provided to the set of candidate users in previous offers and data indicating whether the previous offers were accepted;
    generating a neural network based on the historical training data, the neural network trained to output an acceptance probability score distribution based on content features that describe an input content item and data that describe an input candidate user, the acceptance probability score distribution indicating likelihoods that the input candidate user will view the input content item in exchange for each bid value from a set of bid values;
    generating a first set of content features that describe a first content item;
    using the neural network, on a first input that is based on the first set of content features, to generate a first respective acceptance probability score distribution for each respective candidate user in the set of candidate users to yield a first set of acceptance probability score distributions, each first respective acceptance probability score distribution indicating likelihoods that the respective candidate user will view the first content item in exchange for each bid value from the set of bid values;
    determining a first subset of the set of candidate users to receive an offer to view the first content item and a first set of bid values corresponding to the first subset of the set of candidate users, the determining of the first subset of candidate users being based on the first set of acceptance probability score distributions, user attributes that describe the set of candidate users, and campaign parameters associated with the first content item; and
    providing the offer to view the first content item to at least a first candidate user included in the first subset of the set of candidate users, the offer being based on a first bid value from the first set of bid values, the first bid value corresponding to the first candidate user.

14. The non-transitory computer-readable medium of claim 13, wherein determining the first subset of the set of candidate users to receive the offer to view the first content item and the first set of bid values corresponding to the first subset of the set of candidate users comprises:
    determining a respective utility value for each respective candidate user in the set of candidate users, yielding a set of utility values, each respective utility value indicating a relative value of the respective candidate user to an entity associated with the first content item;
    generating an estimated return utility table based on the set of utility values and the first set of acceptance probability score distributions, the estimated return utility table including a respective set of estimated return utility values for each respective candidate user, each respective set of estimated return utility values including estimated return utility values that indicates an estimated return utility to the entity resulting from the respective candidate user viewing the first content item based on the set of bid values; and selecting the first subset of the set of candidate users and corresponding bid values based on the estimated return utility table.

15. The non-transitory computer-readable medium of claim 14, wherein selecting the first subset of the set of candidate users and corresponding bid values based on the estimated return utility table comprises:
determining, based on a first set of estimated return utility values corresponding to the first candidate user, that:
a first estimated return utility value from the first set of estimated return utility values corresponds to the first bid value,
the first bid value is less than a threshold bid value dictated by the campaign parameters associated with the first content item, and
the first estimated return utility value from the first set of estimated return utility values meets or exceeds a threshold estimated return utility value.

16. The non-transitory computer-readable medium of claim 15, wherein selecting the first subset of the set of candidate users and corresponding bid values based on the estimated return utility table comprises:
determining, based on the first set of estimated return utility values corresponding to the first candidate user, that:
a second estimated return utility value from the first set of estimated return utility values corresponds to a second bid value that is less than the threshold bid value dictated by the campaign parameters associated with the first content item, and
the second estimated return utility value from the first set of estimated return utility values meets or exceeds the threshold estimated return utility value; and
selecting the first bid value for the first candidate user based on determining that the first bid value is less that the second bid value.

17. The non-transitory computer-readable medium of claim 13, wherein the first input is further based on a first set of contextual features describing a current viewing condition.

* * * * *